(12) United States Patent
Kaneko et al.

(10) Patent No.: US 7,199,547 B2
(45) Date of Patent: Apr. 3, 2007

(54) APPARATUS, METHOD OR SYSTEM FOR CONTROLLING MOBILE BODY

(75) Inventors: Daigo Kaneko, Hitachi (JP); Hiromi Inaba, Hitachinaka (JP); Tsunehiro Endo, Hitachiota (JP); Ikuo Yamato, Hitachi (JP); Naoto Ohnuma, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 60 days.

(21) Appl. No.: 09/982,234

(22) Filed: Oct. 19, 2001

(65) Prior Publication Data

US 2002/0175651 A1 Nov. 28, 2002

(30) Foreign Application Priority Data

May 9, 2001 (JP) .............................. 2001-138078

(51) Int. Cl.
*H02P 6/00* (2006.01)
*H02P 23/00* (2006.01)
*H02P 25/00* (2006.01)

(52) U.S. Cl. ...................... 318/700; 318/704; 318/715; 318/721; 318/254; 318/439

(58) Field of Classification Search ........ 318/700–701, 318/704, 714–715, 721, 773, 798–802, 254, 318/439
See application file for complete search history.

(56) References Cited

U.S. PATENT DOCUMENTS

| | | | |
|---|---|---|---|
| 4,922,175 A * | 5/1990 | Sugiura et al. ............. | 318/592 |
| 5,097,192 A | 3/1992 | Iijima ......................... | 318/712 |
| 5,569,994 A | 10/1996 | Taylor et al. ............... | 318/700 |
| 5,726,549 A * | 3/1998 | Okuno et al. ............... | 318/721 |
| 5,796,228 A | 8/1998 | Kojima et al. | |
| 6,005,364 A * | 12/1999 | Acarnley ..................... | 318/701 |
| 6,283,252 B1 * | 9/2001 | Lee ............................. | 187/291 |
| 6,328,136 B1 * | 12/2001 | Tauchi et al. ............... | 318/254 |
| 6,396,229 B1 * | 5/2002 | Sakamoto et al. .......... | 318/439 |
| 6,906,491 B2 * | 6/2005 | Matsuo et al. .............. | 318/722 |
| 2004/0257027 A1 * | 12/2004 | Matsuo et al. .............. | 318/722 |
| 2006/0113949 A1 * | 6/2006 | Nishimura et al. ......... | 318/723 |

FOREIGN PATENT DOCUMENTS

| | | | |
|---|---|---|---|
| JP | 04-251592 | * | 9/1992 |
| JP | 07-322683 | | 12/1995 |
| JP | 8-260811 | | 10/1996 |
| JP | 09-056199 | | 2/1997 |
| JP | 10-080188 | | 3/1998 |

* cited by examiner

*Primary Examiner*—Marlon Fletcher
(74) *Attorney, Agent, or Firm*—Crowell & Moring LLP

(57) ABSTRACT

In order to control the position of a mobile body without using a position detector, a magnetic pole position of a rotor of a synchronous motor is estimated based on electrical quantities in relation to electric power supplied to the synchronous motor and then the mobile body position is estimated based on the estimated magnetic pole position.

16 Claims, 6 Drawing Sheets

APPARATUS, METHOD OR SYSTEM FOR CONTROLLING MOBILE BODY

BACKGROUND OF THE INVENTION

The present invention relates to an apparatus and a method of controlling a mobile body, and a mobile body system.

A synchronous motor that uses a permanent magnet to create a magnetic field has recently been applied to various mechanical apparatuses for the purpose of reducing the size of the apparatuses and increasing efficiency.

However, in order to control rotation of a synchronous motor, it is necessary to recognize the position of a rotor, i.e. a magnetic pole position, and to control power supply. To do so, means for detecting a magnetic pole position is required. For example, the prior art disclosed in Japanese Application Patent Laid-Open Publication No. Hei 10-80188 requires a magnetic pole position sensor. This kind of magnetic pole position detector requires effort to align a motor shaft with an encoder shaft or complicated, painstaking maintenance.

To eliminate such problems, there have been some studies of technology to control a magnetic pole position of a synchronous motor without using a sensor, as described in Proceedings of the 2000 Japan Industry Applications Society Conference "No.97: A New Position Sensor-less Control of Permanent Magnet Synchronous Motor using Direct Position Error Estimation, Pages 963–966.

FIG. 10 illustrates an example of a permanent magnet-type synchronous motor control system in accordance with the magnetic pole position sensor-less control technology. This control system comprises a first coordinate transformer $3a$ which obtains detected current values Id and Iq of a rotating coordinate system by inputting motor phase detected current values Iu and Iw detected by a current detector, an axis error estimator $3b$ which obtains an error $\Delta\theta$ between a magnetic pole position $\theta$m of a motor rotor and an estimated magnetic pole position value $\theta$mc by inputting the detected current values Id and Iq, a motor speed computing element $3c$ which obtains estimated motor speed $\omega$m by inputting the error $\Delta\theta$, a rotor position estimator $3d$ which obtains an estimated magnetic pole position value omc by inputting the estimated motor speed $\omega$m, a current command computing element $3e$ which obtains current command values Id* and Iq* by inputting the estimated motor speed $\omega$m and a motor speed command value $\omega$m*, an output voltage command computing element $3f$ which obtains output voltage commands Vd* and Vq* by inputting the current command values Id* and Iq*, and a second coordinate transformer $3g$ which obtains drive unit drive commands Vu*, Vv* and Vw* for driving the motor by inputting the output voltage commands Vd* and Vq*. This example uses an estimated value $\theta$mc obtained by a rotor position estimator $3d$ as a magnetic pole position em so that a permanent magnet-type synchronous motor can be driven without requiring a magnetic pole position sensor.

Technology mentioned above has made it possible to rotate a synchronous motor without requiring a detector which detects a magnetic pole position of the rotor.

For example, in Japanese Application Patent Laid-Open Publication No. 2000-78878, an example of an actual mobile body system is shown that applies the sensor-less control technology for controlling a magnetic pole position of a synchronous motor. However, this example requires an encoder as a mobile body position detector so that the mobile body system itself can be controlled to stop at a fixed point.

SUMMARY OF THE INVENTION

Problems still remain when a mobile body position detector is required: difficulties in mounting the detector, unnecessary occupation of space, and adverse effects on the system's reliability.

The main purpose of the present invention is to control the position of a mobile body without using a position detector as to a mobile body system that uses a synchronous motor as a driving power source.

The above problems can be solved by estimating a magnetic pole position of a rotor of a synchronous motor based on electrical quantities in relation to electric power supplied to the synchronous motor and further by estimating the mobile body position on the basis of the estimated magnetic pole position. Here, electrical quantities in relation to electric power supplied to a synchronous motor are currents or voltages that are supplied to the synchronous motor.

This means makes it possible to control the position of a mobile body without using a mobile body position detector because the position of a mobile body is estimated based on a magnetic pole position of the rotor of the synchronous motor according to electrical quantities. Further, this means preferably makes it possible to highly accurately control the position by correcting an estimated position of the mobile body based on absolute position information of the mobile body.

A mobile body can be any of an elevator car, elevator counter weight, elevator door, escalator step, rolling stock, and so on. A synchronous motor can be any of a permanent magnet-type synchronous motor, wire-wound synchronous motor, synchronous reluctance motor, and so on.

DETAILED DESCRIPTION OF THE INVENTION

Figure 1:
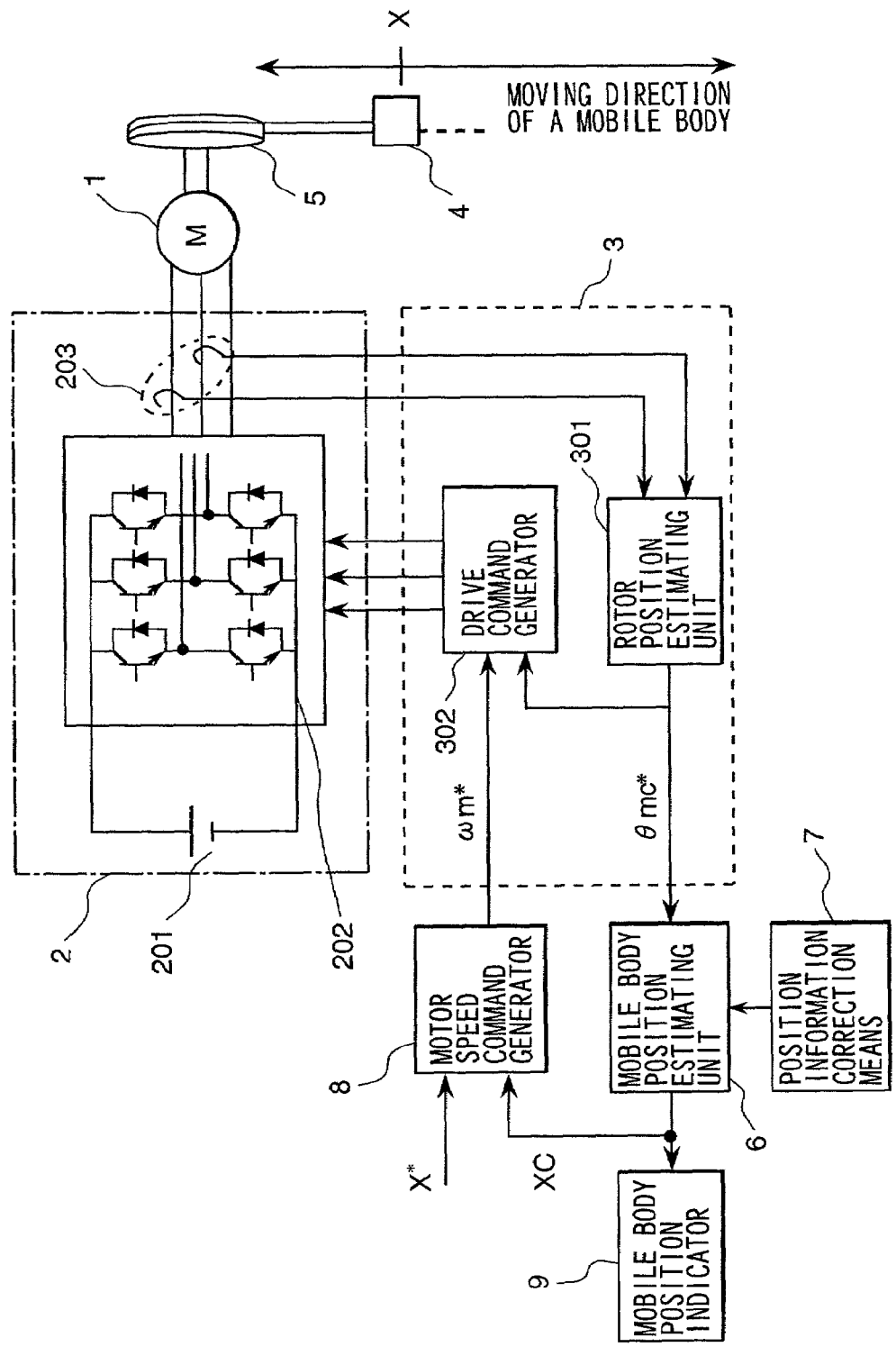
FIG. 1 is a mobile body system which is a first embodiment of the present invention.

FIG. 1 illustrates a mobile body system which is a first embodiment of the present invention. In FIG. 1, there are shown a synchronous motor 1 which generates torque to drive a mobile body 4, a drive unit 2 which supplies electric power to the synchronous motor 1, a controller 3 which controls the drive unit 2, the mobile body 4, and mobile body driving means 5 which is mechanically connected to the synchronous motor 1 and drives the mobile body 4 by using the torque generated by the synchronous motor 1. Further, the drive unit 2 comprises a DC power source 201, a power converter 202 which converts DC power from the DC power source 201 to AC power, and a current detector 203 which detects current supplied to the synchronous motor 1. The controller 3 comprises a rotor position estimator 301 which estimates a magnetic pole position of a rotor of a synchronous motor from the current detected by the current detector 203, and a drive command generator 302 which generates drive commands given to the drive unit 2 based on a magnetic pole position θmc estimated by the rotor position estimator 301 so that the speed of the synchronous motor 1 will approach a speed command ωm*. Furthermore, there are shown a mobile body position estimator 6 which estimates the position of the mobile body 4 from a magnetic pole position θmc estimated by the rotor position estimator 301, position information correcting means 7 which imports absolute position information of the mobile body 4 thereby correcting mobile body position information stored in the mobile body position estimator 6, and a motor speed command generator 8 which creates a speed command ωm* and sends it to the drive command generator 302 so that the estimated mobile body position Xc that is obtained by the mobile body position estimator 6 will approach a position command X* of the mobile body 4. There is also shown a position indicator 9 which creates position information of the mobile body 4 based on the estimated mobile body position Xc and displays the information.

Figure 10:
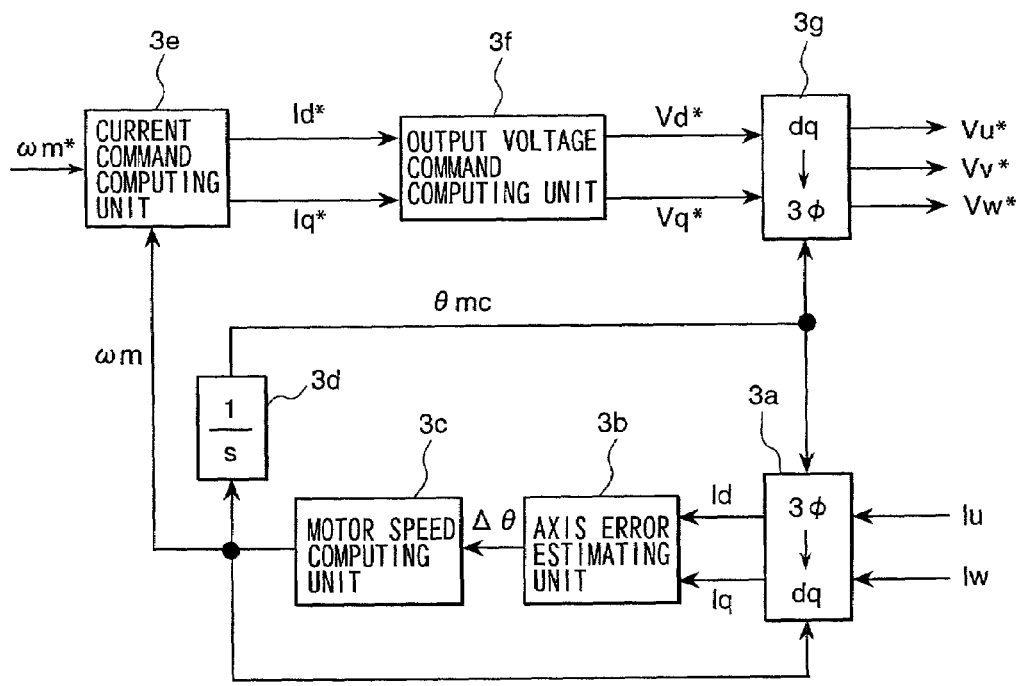
FIG. 10 is an example that shows a configuration of a synchronous motor drive control system.

Next, operations of a mobile body system which is a first embodiment of the present invention will be described. A power converter 202 converts DC power supplied from a DC power source 201 to AC power according to drive commands generated by a drive command generator 302 and outputs the AC power to rotate a synchronous motor 1. A mobile body 4 uses the synchronous motor 1 as a power source via drive means 5 to change its position. Further, a rotor position estimator 301 estimates a position θm of a rotor of the synchronous motor 1 by using an output of a current detector 203 and outputs the estimated quantity θmc. Here, a variety of configurations of a controller 3 can be expected including a position estimation method by a rotor position estimator 301. For example, an embodiment shown in FIG. 10 is one of those configurations.

Now, a mobile body position estimator 6 will be described. A relationship between a rotor position θm of a synchronous motor 1 and a position X of a mobile body 4 will be explained. Here, if the mobile body drive means 5 is a driving wheel and the distance the mobile body 4 travels when the driving wheel makes one revolution is L, the distance the mobile body 4 travels when the rotor of the synchronous motor 1 makes one revolution is also L. This indicates that there is a relationship between X and θm as shown in the following equation.

$$x = x0 + \int_0^t \left( \frac{L}{360[\deg.]} \cdot \frac{d\theta m[\deg.]}{dt} \right) dt \quad (1)$$

Here, X0 indicates the initial position of the mobile body. The relationship expressed by the following equation usually holds.

$$\theta m = \theta mc \quad (2)$$

Accordingly, the position X of the mobile body 4 can be estimated by using the estimated position θmc output by a rotor position estimator 301, and the relationships expressed by Equations (1) and (2). Specifically, in a mobile body position estimator 6, an estimated position Xc can be obtained by Equation (3) in which a position X is replaced with an estimated mobile body position Xc instead of Equation (1).

$$x_c = x0 + \int_0^t \left( \frac{L}{360[\deg.]} \cdot \frac{d\theta mc[\deg.]}{dt} \right) dt \quad (3)$$

As described above, this embodiment can obtain position information of a mobile body driven by a synchronous motor without employing a dedicated mobile body position detector. Further, the magnetic pole position of the rotor of the synchronous motor corresponds to the distance a mobile body travels. Therefore, the position of a mobile body can relatively easily and accurately be estimated from the estimated value of the magnetic pole position.

Next, position information correcting means 7 will be described. As described above, a mobile body position estimator 6 estimates the position of a mobile body 4, however, an error occurs between the actual mobile body position X and the estimated mobile body position Xc because the relationship expressed by Equation (1) is destroyed due to drive means 5 slipping or worn out. At this point, position information correcting means 7 imports absolute position information of a mobile body 4 and outputs information to correct mobile body position information stored in a mobile body position estimator 6. Absolute position information is input into the mobile body position estimator 6 by the position information correcting means 7. The mobile body position estimator 6 uses the newly entered absolute position information as an estimated mobile body position Xc. This makes it possible to correct an estimated position and set a correct position even though an error occurs between an actual position of a mobile body 4 and an estimated position obtained by a mobile body position estimator 6. Thus, a mobile body position can be accurately estimated by using position information correcting means 7.

Further, a motor speed command generator 8 inputs a mobile body position command X* and an estimated mobile body position Xc to generate a speed command ωm* given to a synchronous motor 1 so that the estimated mobile body position Xc will approach the target position X*. If the motor speed command generator 8 can reduce the motor speed command to 0 (zero) at a predetermined fixed point, it is possible to control a stop position of the mobile body 4. Thus, such a motor speed command generator 8 makes it possible to control the position of a mobile body without using a mobile body position detector.

Furthermore, a mobile body position indicator 9 inputs an estimated mobile body position Xc to create position information of a mobile body 4 and indicates the information. Such a mobile body position indicator 9 makes it possible to indicate a position of a mobile body without using a mobile body position detector.

It is also possible to reduce the size of a mobile body system and save energy by using a permanent magnet-type synchronous motor as a synchronous motor 1.

A power source which has rectified an alternate current by a rectifier circuit or a battery can be used as a DC power source 201. Further, the estimated rotor position quantity θmc can be calculated not only based on the output current from the power converter 202, but also based on output voltage, input DC current, or DC voltage. In this case, a detector for detecting those electrical quantities is mounted instead of a current detector 203 and a calculation method executed by a controller 3 including a rotor position estimator 301 is changed. Furthermore, in an embodiment shown in FIG. 1, mobile body position information stored in a mobile body position estimator is corrected according to absolute position information of a mobile body by using position information correcting means. This can be applied to cases where the mobile body position is estimated from not only an estimated rotor position, but also from a detected value of the rotor position, or a detected or estimated value of the number of revolutions of the rotor.

Figure 2:
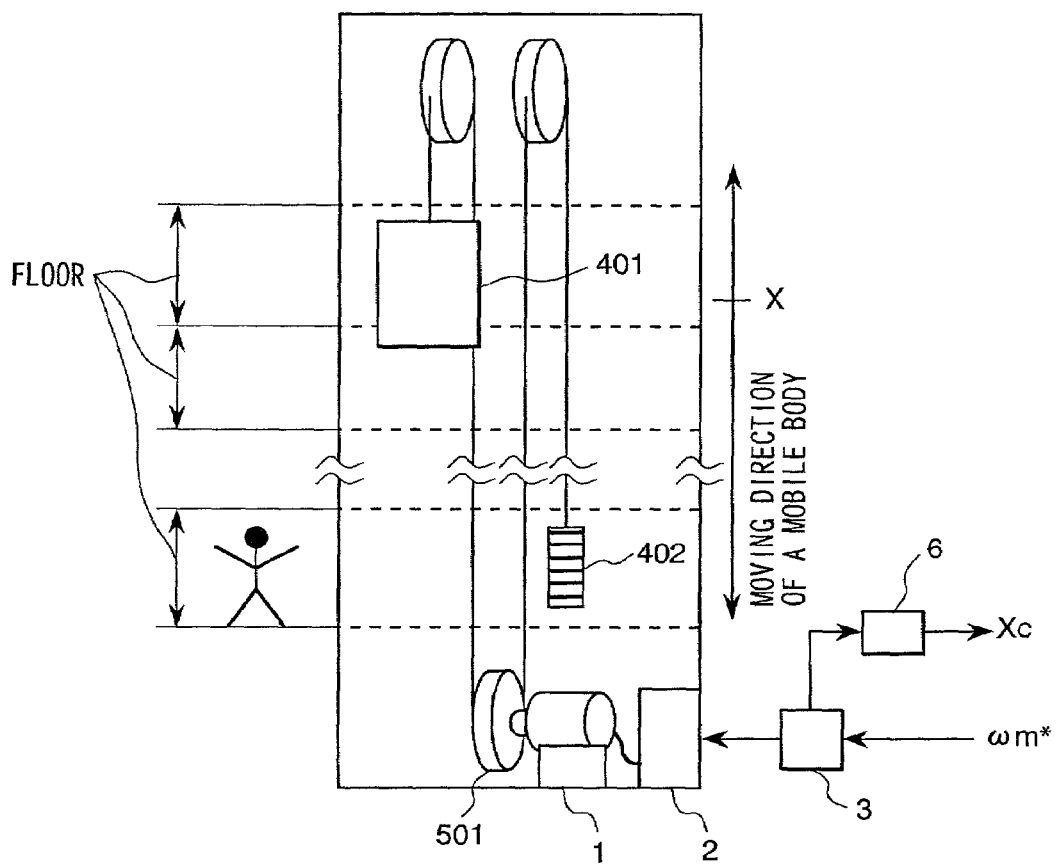
FIG. 2 is a mobile body system which is a second embodiment of the present invention.

FIG. 2 illustrates a mobile body system which is a second embodiment of the present invention. In this embodiment, an elevator car 401 and a counter weight 402 are mobile bodies and a sheave 501 is drive means 5. The elevator car 401 and the counter weight 402 are driven by a synchronous motor 1 via the sheave 501. Operations of other elements are the same as those that are explained in a first embodiment. This embodiment can detect and control the position of the elevator car 401 or the counter weight 402 without using a magnetic pole position detector of a synchronous motor 1 or a position detector for the elevator car 401 or the counter weight 402.

When a motor is installed in the bottom or top of an elevator shaft as shown in the embodiment of FIG. 2 and if a magnetic pole position detector is required, it becomes difficult to replace, mount, or adjust the magnetic pole position detector. This embodiment eliminates such a problem.

Figure 3:
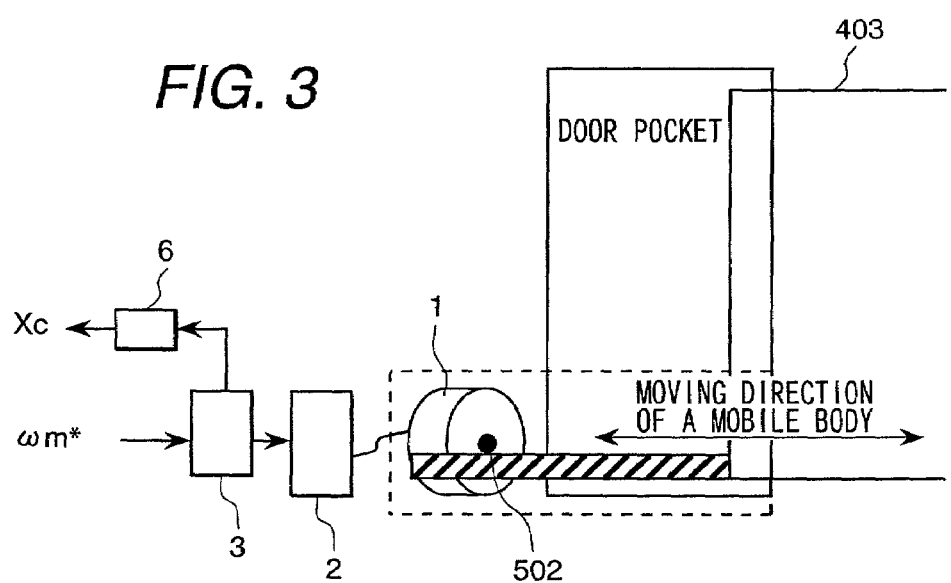
FIG. 3 is a mobile body system which is a third embodiment of the present invention.

FIG. 3 illustrates a mobile body system which is a third embodiment of the present invention. In this embodiment, an elevator door 403 is a mobile body and a door drive unit 502 is drive means 5. The elevator door 403 is driven by a synchronous motor 1 via the door drive unit 502. Operations of other elements are the same as those that are explained in a first embodiment. When the installation space is very small and limited, this embodiment increases equipment layout space and saves installation space.

If the embodiment shown in FIG. 3 is applied to another door which is driven by a synchronous motor but is not an elevator door, the same effect can be expected.

Figure 4:
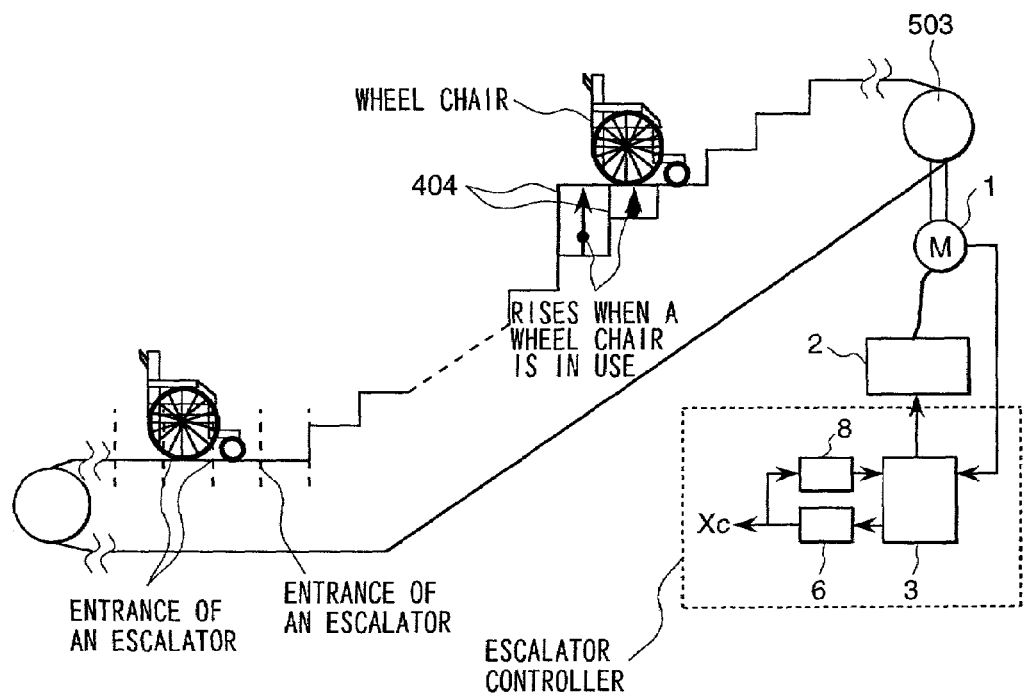
FIG. 4 is a mobile body system which is a fourth embodiment of the present invention.

FIG. 4 illustrates a mobile body system which is a fourth embodiment of the present invention. In this embodiment, a mobile body system is applied to a wheel chair compatible escalator wherein wheel chair compatible steps 404 are mobile bodies and step drive means 503 is drive means 5. Escalator steps including wheel chair compatible steps 404 are driven by a synchronous motor 1 via the step drive means 503. Operations of other elements are the same as those that are explained in a first embodiment.

The wheel chair compatible escalator has a function that horizontally aligns at least two or three wheel chair compatible steps 404, among steps connected in a ring as shown in FIG. 4, at one location so that a wheel chair can be placed on those steps. For example, when a wheel chair request button is pressed, a controller of the wheel chair compatible escalator, i.e. a mobile body system, estimates the position of the wheel chair compatible steps 404 by using a mobile body position estimator 6 and stops the steps at the entrance of the escalator. This embodiment can detect the position of the steps without using a position detector which protrudes in the direction parallel to the steps. Consequently, it is possible to decrease a width of the escalator thereby making the best use of space in a building where the escalator is installed.

Figure 5:
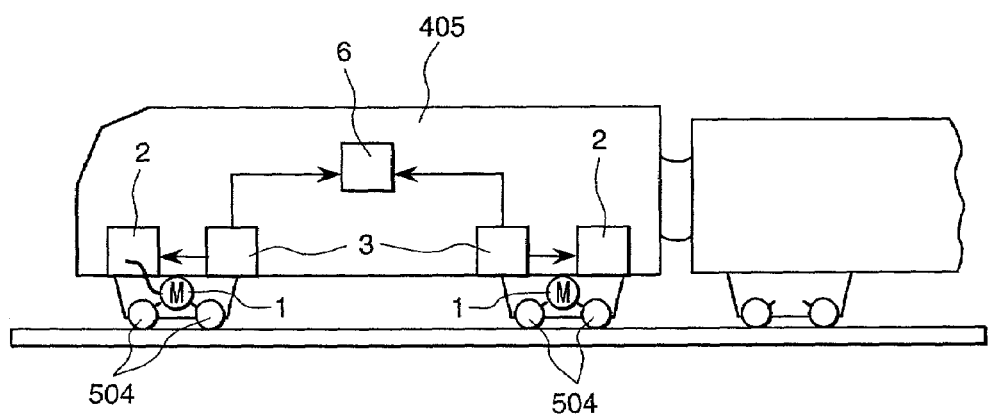
FIG. 5 is a mobile body system which is a fifth embodiment of the present invention.

FIG. 5 illustrates a mobile body system which is a fifth embodiment of the present invention. In this embodiment, rolling stock 405 is a mobile body and driving wheels 504 are drive means. Operations of other elements are the same as those that are explained in a first embodiment. A commonly-used conventional signal system can distinguish the presence of a train located in a given block section, however, it cannot detect the position of the train or the number of trains in the same block section. On the other hand, this embodiment can obtain position information of each train. Thus, it is possible to obtain position information of a plurality of trains which exist in a block section without employing an especially accurate position detector. As a result, high traffic density train running schedule becomes feasible.

Figure 6:
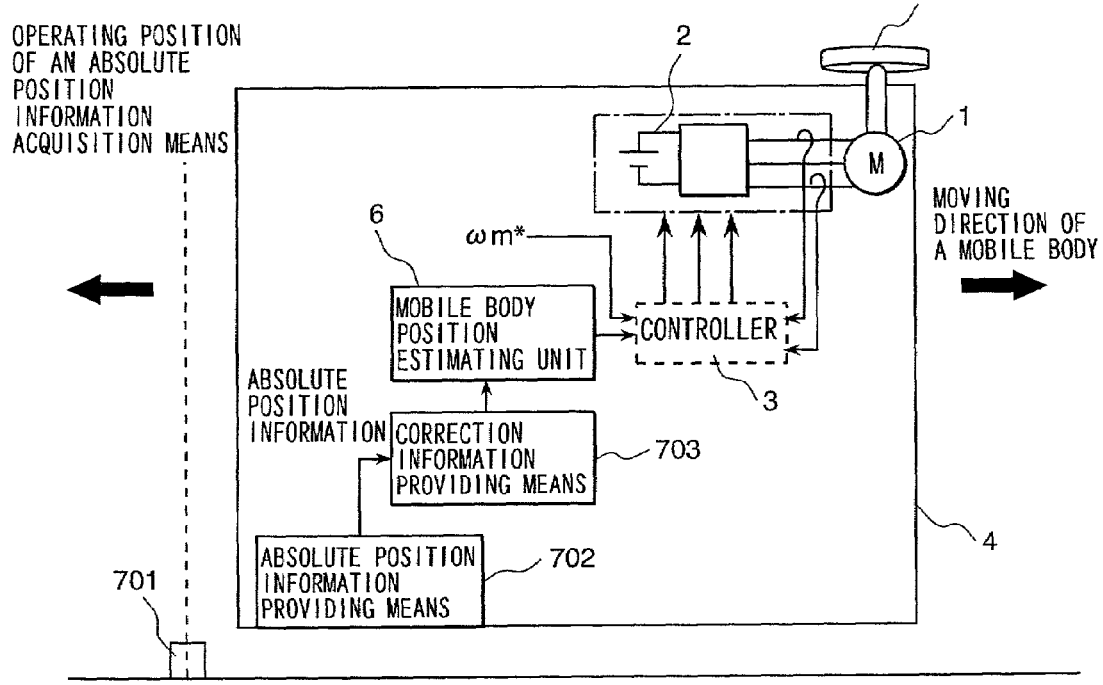
FIG. 6 is a mobile body system which is a sixth embodiment of the present invention.

FIG. 6 illustrates a mobile body system which is a sixth embodiment of the present invention. In this embodiment, position information correcting means 7 comprises a fixed point 701 disposed in the traveling area of a mobile body 4, absolute position information providing means 702 which provides position information obtained when the mobile body 4 passes by the fixed point 701 as absolute position information, and information providing means 703 which inputs the absolute position information and outputs position information to correct absolute position information stored in a mobile body position estimator 6.

In the embodiment shown in FIG. 6, if an error occurs in the position of the mobile body 4 estimated by the mobile body position estimator 6, the estimated position will be corrected by the following procedures. A plurality of fixed points 701 comprising metal shielding plates and the like are installed at specified positions, for example, in front of and at the back of the mobile body stop position. Absolute position information providing means 702 comprising of a positector or the like is placed on the mobile body side. The absolute position information providing means 702 accepts interrupt when it is opposed to the fixed point 701, reads out absolute position information which has been made into a table and overwrites position information stored in the mobile body position estimator 6. This makes it possible to consistently and accurately estimate the position of a mobile body when the mobile body passes by a specified position. This embodiment compensates for errors caused by slippery or worn-out drive means 5. As a consequence, position estimation by a mobile body position estimator 6 becomes highly reliable and accurate.

Figure 7:
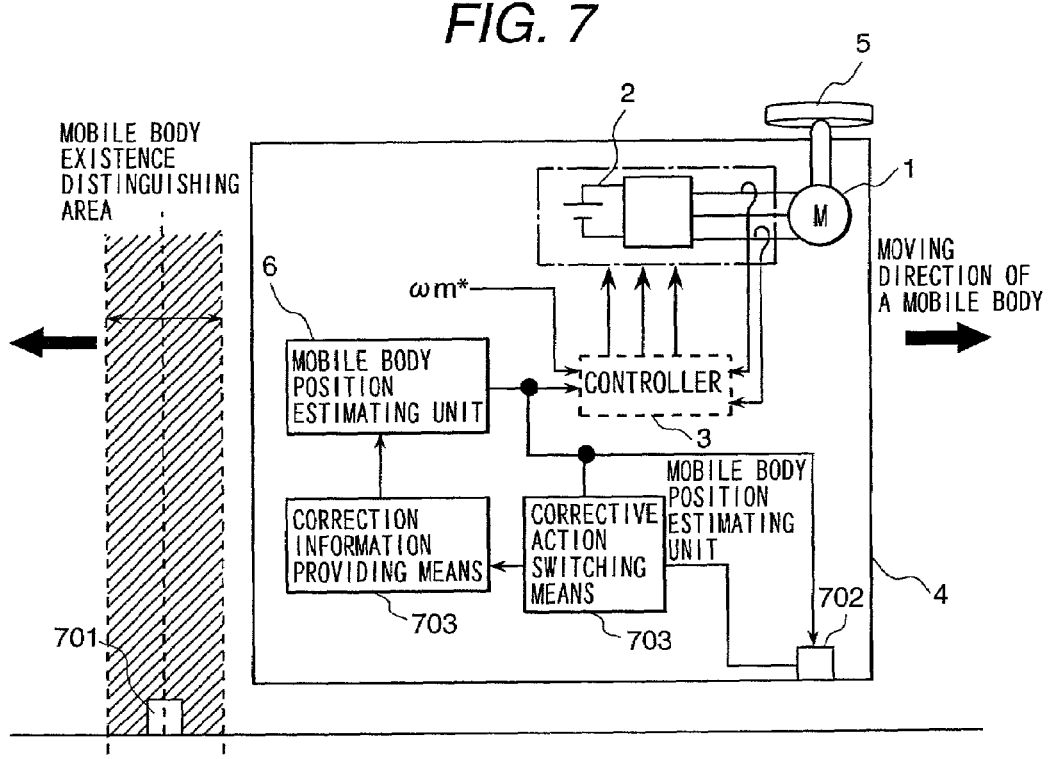
FIG. 7 is a mobile body system which is a seventh embodiment of the present invention.

FIG. 7 illustrates a mobile body system which is a seventh embodiment of the present invention. In this embodiment, correcting operation switching means 704 is added to the embodiment shown in FIG. 6. When a mobile body position estimator 6 estimates that a mobile body 4 exists in the mobile body existence detecting area which is a vicinity of a fixed point 701, the correcting operation switching means 704 accepts interrupt by absolute position information providing means 702 which is opposed to the fixed point 701 and enables position information correcting operation via correction information providing means 703. This allows the absolute position information providing means 702 to operate only in the vicinity of the area where correcting operation is originally conducted. Accordingly, it is possible to reduce malfunction due to noise.

Furthermore, in order to increase the accuracy of stopping a mobile body at a predetermined position, it is recommended that a fixed point 701, shown in FIG. 6 and FIG. 7, be installed at a position in front of each floor when a mobile body is an elevator car, at the fully opened or fully closed end when a mobile body is an elevator door, and at an entrance or an exit of an escalator when a mobile body system is a wheel chair compatible escalator.

Figure 8:
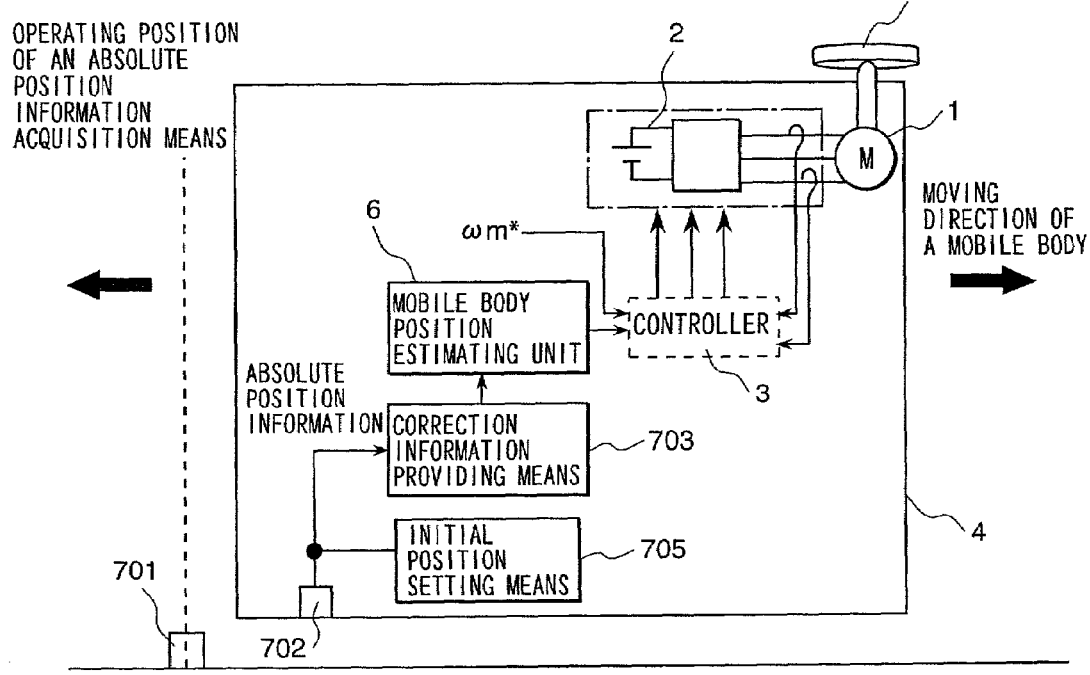
FIG. 8 is a mobile body system which is an eighth embodiment of the present invention.

FIG. 8 illustrates a mobile body system which is an eighth embodiment of the present invention. In this embodiment, position information correcting means 7 comprises a fixed point 701, absolute position information providing means 702, correction information providing means 703 which outputs corrective position information so that a mobile body position estimator 6 can correct an estimated position, and initial position setting means 705 which outputs corrective position information at the initial state.

Next, an initial position setting operation by the embodiment shown in FIG. 8 will be described. The value X0 in Equation (1) is initially set when a system is activated by turning on the power. Specifically, after the power is turned on, a mobile body slowly travels to an end of the traveling range. After the initial absolute position information is obtained, the value X0 stored in a mobile body position estimator 6 is initialized by initial position setting means 705. After that, in order to measure the position of a fixed point, a revolution is made at a speed that does not race the drive means. When position information which corresponds to the absolute position of each fixed point is obtained, settings of initial position information is completed. For example, when a mobile body is an elevator car or a counter weight, an initial position setting operation starts either at the top or bottom of an elevator shaft. When a mobile body is rolling stock, an initial position setting operation starts when a fixed point placed at an originating station is opposed to absolute position information providing means 702. This embodiment does not require designing and setting the absolute position of a plurality of fixed points beforehand and easily establishes a position information correcting system.

Figure 9:
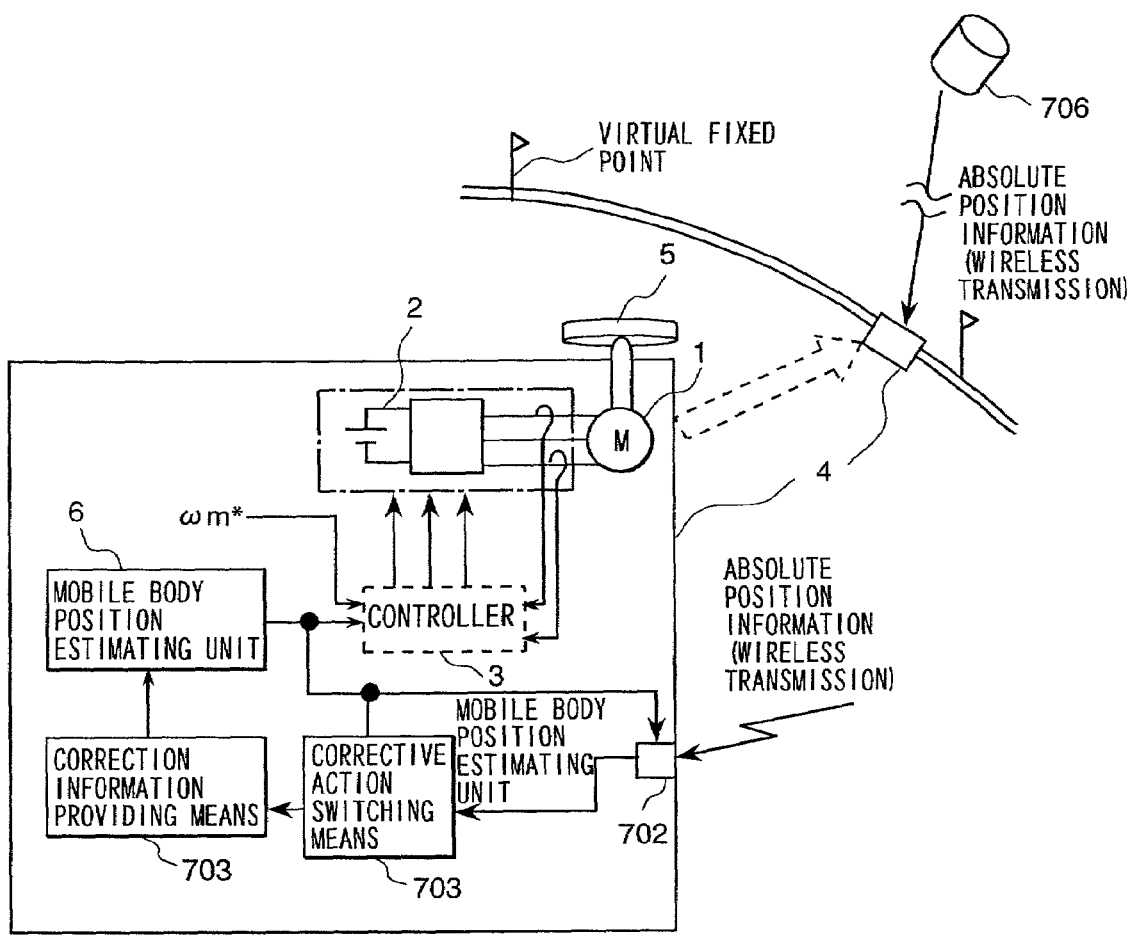
FIG. 9 is a mobile body system which is a ninth embodiment of the present invention.

FIG. 9 illustrates a mobile body system which is a ninth embodiment of the present invention. In this embodiment, position information correcting means 7 comprises absolute position information providing means 702, correction information providing means 703, correcting operation switching means 704, and a satellite 706.

Operations of the embodiment shown in FIG. 9 will be described in the following. Absolute position information providing means 702 obtains absolute position information from a satellite 706 and outputs the information. When a mobile body position estimator 6 estimates that a mobile body 4 has reached a predetermined point in the traveling area, correcting operation switching means 704 accepts absolute position information which is output by the absolute position information providing means 702 and enables position information correcting operation via correction information providing means 703. This embodiment can correct shifts of an estimated position obtained by the mobile body position estimator 6 without placing a fixed point in the mobile body traveling area. Further, a wireless station installed on the ground can be used instead of a satellite as means by which the absolute position information providing means obtains absolute position information.

Moreover, as shown in any one of embodiments described above, a method of correcting a mobile body position estimated by a mobile body position estimator based on absolute position information of a mobile body or setting the initial value of a mobile body position can be applied to cases where a mobile body position is estimated not only from an estimated rotor position, but also from a detected value of a rotor position, or a detected or estimated value of the number of revolutions of the rotor.

The present invention can detect a position of a mobile body without using a mobile body position detector. Further, correcting an estimated position of a mobile body by using absolute position information increases the accuracy and reliability of mobile body position estimation.

What is claimed is:

1. A controller for a mobile body driven by a synchronous motor via a drive unit, comprising:
   a rotor position estimator which estimates a magnetic pole position of a rotor of said synchronous motor based on electrical quantities in relation to electric power supplied to said synchronous motor;
   a mobile body position estimator which estimates the position of said mobile body from the magnetic pole position estimated by said rotor position estimator and an initial value of the position of said mobile body, said position of said mobile body being changed corresponding to a distance that said mobile body travels due to the revolution of said motor; and
   a position information correction unit which corrects the position of said mobile body estimated by said mobile body position estimator based on absolute position information of said mobile body before said mobile body stops.

2. A mobile body controller as claimed in claim 1, further comprising a motor speed command generator which controls the speed of said synchronous motor based on the position command and the position of said mobile body estimated by said mobile body position estimator.

3. A mobile body controller as claimed in claim 2, further comprising position information correcting means which corrects the position of said mobile body estimated by said mobile body position estimator based on absolute position information of said mobile body.

4. A mobile body controller as claimed in claim 2, wherein the initial value of the position of said mobile body estimated by said mobile body position estimator is set based on the absolute position information of said mobile body.

5. A mobile body controller as claimed in claim 2, wherein said mobile body is an elevator car.

6. A mobile body controller as claimed in claim 5, further comprising a mobile body position indicator, which displays the position information along floors or an elevator shaft of said elevator car estimated by said mobile body position estimator.

7. A mobile body controller as claimed in claim 1, wherein the initial value of the position of said mobile body estimated by said mobile body position estimator is set based on the absolute position information of said mobile body.

8. A mobile body controller as claimed in claim 1, wherein said mobile body is an elevator car.

9. A mobile body controller as claimed in claim 8, further comprising a mobile body position indicator, which displays the position information along floors or an elevator shaft of said elevator car estimated by said mobile body position estimator.

10. A mobile body controller comprising:
    a rotor position estimator which estimates a magnetic pole position of a rotor of said synchronous motor based on electrical quantities in relation to electric power supplied to said synchronous motor;
    a mobile body position estimator which estimates the position of said mobile body from the magnetic pole position estimated by said rotor position estimator, said position of said mobile body being changed corresponding to a distance that said mobile body travels due to the revolution of said motor; and a mobile body position indicator which displays information on the position of said mobile body estimated by said mobile body position estimator.

11. A mobile body controller as claimed in claim 10, wherein said absolute position information is position information obtained when said mobile body passes by a fixed point installed in the traveling area of said mobile body.

12. A mobile body controller as claimed in claim 11, wherein correcting operation by said position information correcting means is enabled when said mobile body exists in the vicinity of said fixed point.

13. A mobile body system, comprising:
   a mobile body driven by a synchronous motor via a drive unit; and
   a controller which controls the speed of said synchronous motor so that the position of said mobile body approaches the position command,
   said controller having
   a rotor position estimator which estimates a magnetic pole position of a rotor of said synchronous motor based on electrical quantities in relation to electric power supplied to said synchronous motor,
   a mobile body position estimator which estimates the position of said mobile body from the magnetic pole position estimated by said rotor position estimator and an initial value of the position of said mobile body,
   a motor speed command generator which controls the speed of said synchronous motor based on the position command and the position of said mobile body estimated by said mobile body position estimator, said position of said mobile body being changed correspondingly to a distance that said mobile body travels due to the revolution of said motor, and
   a position information correction unit which corrects the position of said mobile body estimated by said mobile body position estimator based on absolute position information of said mobile body before said mobile stops.

14. A mobile body system as claimed in claim 13, wherein the initial value of the position of said mobile body estimated by said mobile body position estimator is set based on the absolute position information of said mobile body.

15. A mobile body controller comprising:
   a rotor position estimator which estimates a magnetic pole position of a rotor of said synchronous motor based on electrical quantities in relation to electric power supplied to said synchronous motor;
   a mobile body position estimator which estimates the position of said mobile body from the magnetic pole position estimated by said rotor position estimator, said position of said mobile body being changed correspondingly to a distance that said mobile body travels due to the revolution of said motor,
   a motor speed command generator which controls the speed of said synchronous motor based on the position command and the position of said mobile body estimated by said mobile body position estimator, and
   a mobile body position indicator which displays information on the position of said mobile body estimated by said mobile body position estimator.

16. A controller for a mobile body driven by a synchronous motor via a drive unit, the controller comprising:
   a rotor position estimator which estimates a magnetic pole position of a rotor of said synchronous motor based on electrical quantities in relation to electric power supplied to said synchronous motor;
   a mobile body position estimator which estimates the position of said mobile body the magnetic pole position estimated by said rotor position estimator and an initial value of the position of said mobile body, the estimated position being usable to control the mobile body, said position of said mobile body being changed correspondingly to a distance that said mobile body travels due to the revolution of said motor; and
   a position information correction unit which corrects the position of said mobile body estimated by said mobile body position estimator based on absolute position information of said mobile body before said mobile body stops.

* * * * *